Dec. 15, 1953     E. J. G. LAVERDISSE     2,662,350
PROCESS AND APPARATUS FOR POLISHING GLASS
Filed March 23, 1949     7 Sheets-Sheet 1
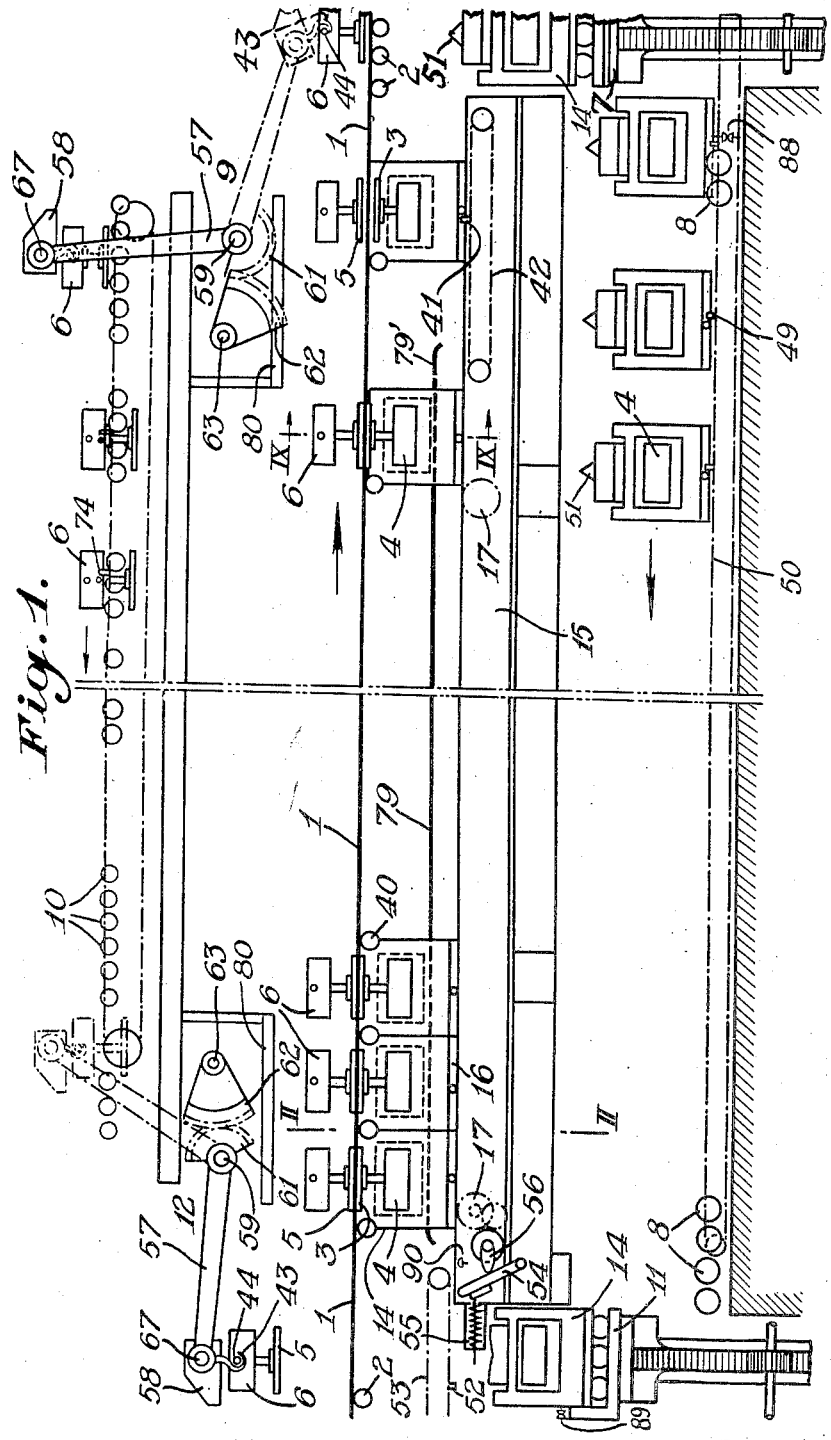
INVENTOR:
EDMOND J. G. LAVERDISSE
By: Haseltine, Lake & Co.
AGENTS Dec. 15, 1953     E. J. G. LAVERDISSE     2,662,350
PROCESS AND APPARATUS FOR POLISHING GLASS
Filed March 23, 1949     7 Sheets-Sheet 2
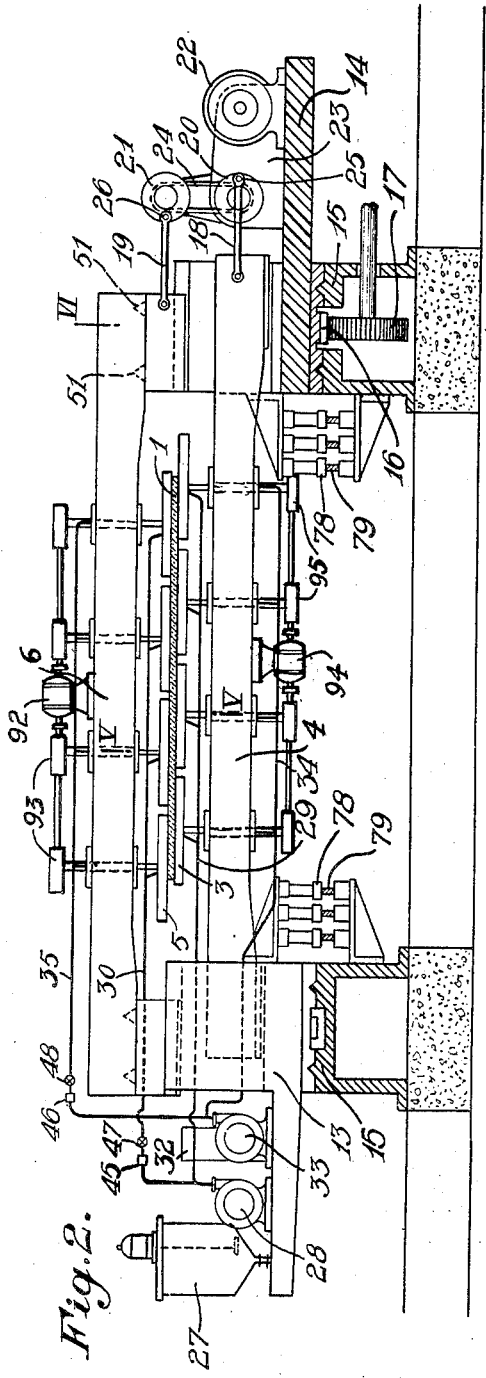
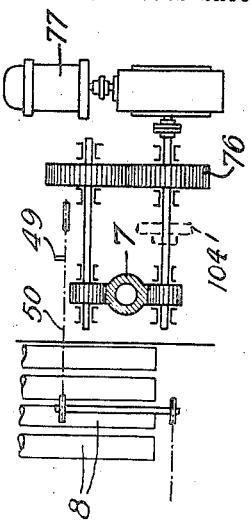
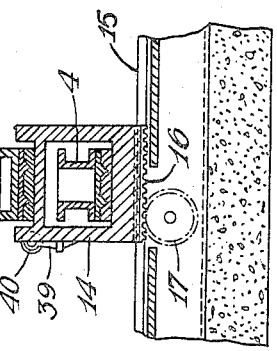
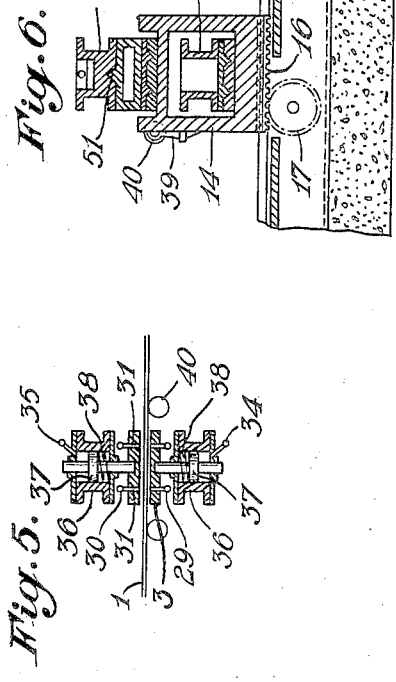
INVENTOR:
EDMOND J. G. LAVERDISSE
By: Hazeltine, Lake & Co.
AGENTS Dec. 15, 1953 E. J. G. LAVERDISSE 2,662,350
PROCESS AND APPARATUS FOR POLISHING GLASS
Filed March 23, 1949 7 Sheets-Sheet 3
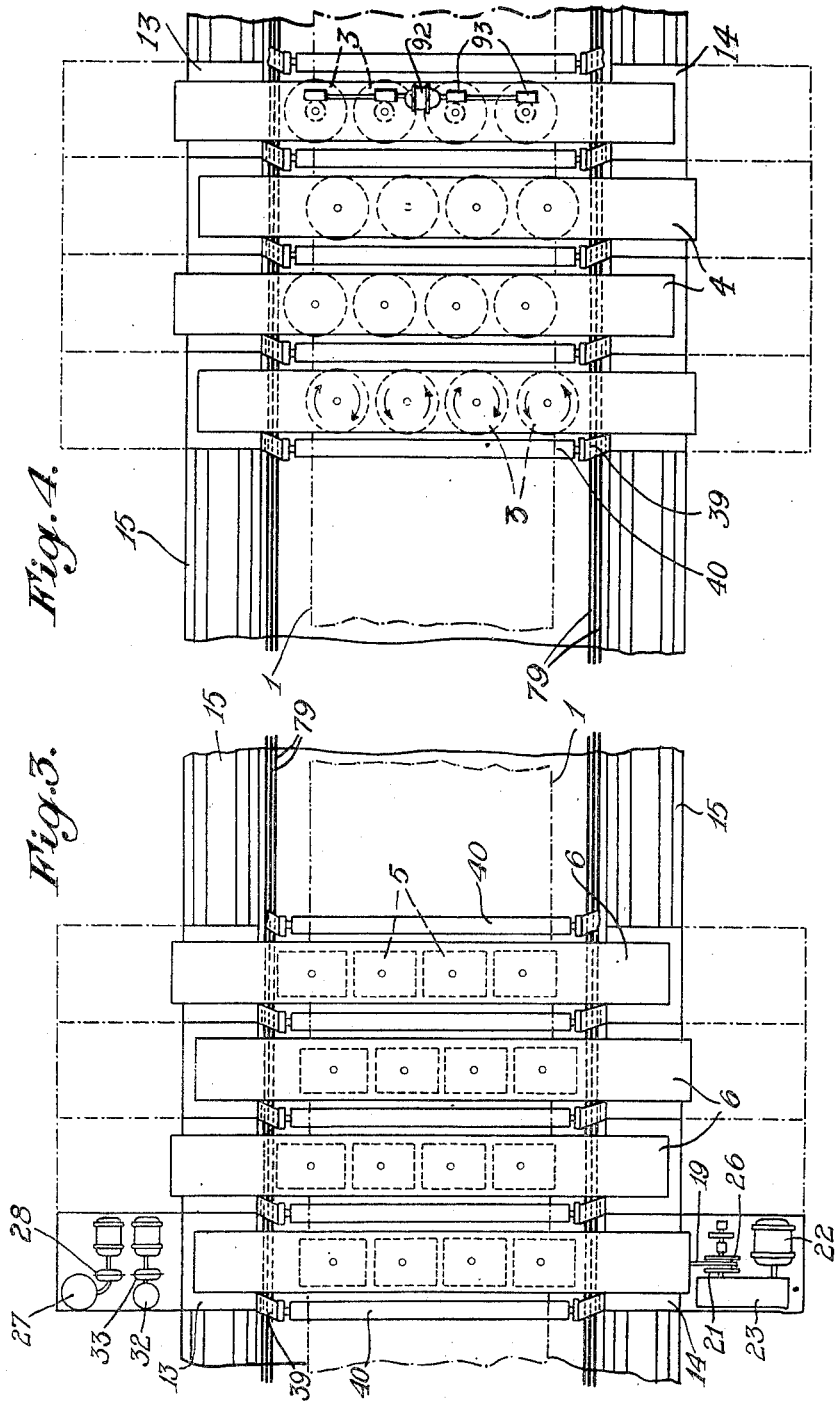
INVENTOR
EDMOND J. G. LAVERDISSE
By: Hazeltine, Lake & Co.
AGENTS

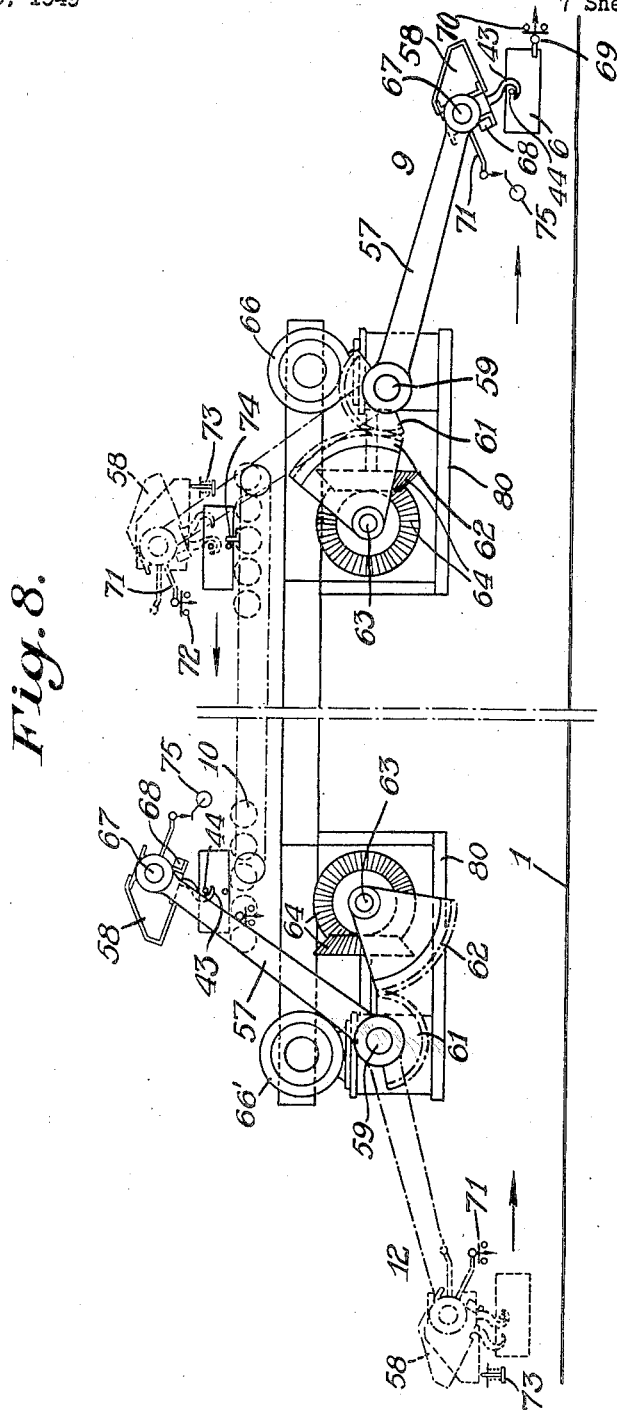

Dec. 15, 1953 E. J. G. LAVERDISSE 2,662,350
PROCESS AND APPARATUS FOR POLISHING GLASS
Filed March 23, 1949 7 Sheets-Sheet 5

INVENTOR:
EDMOND J.G. LAVERDISSE
By: Hazeltine, Lake & Co.
AGENTS

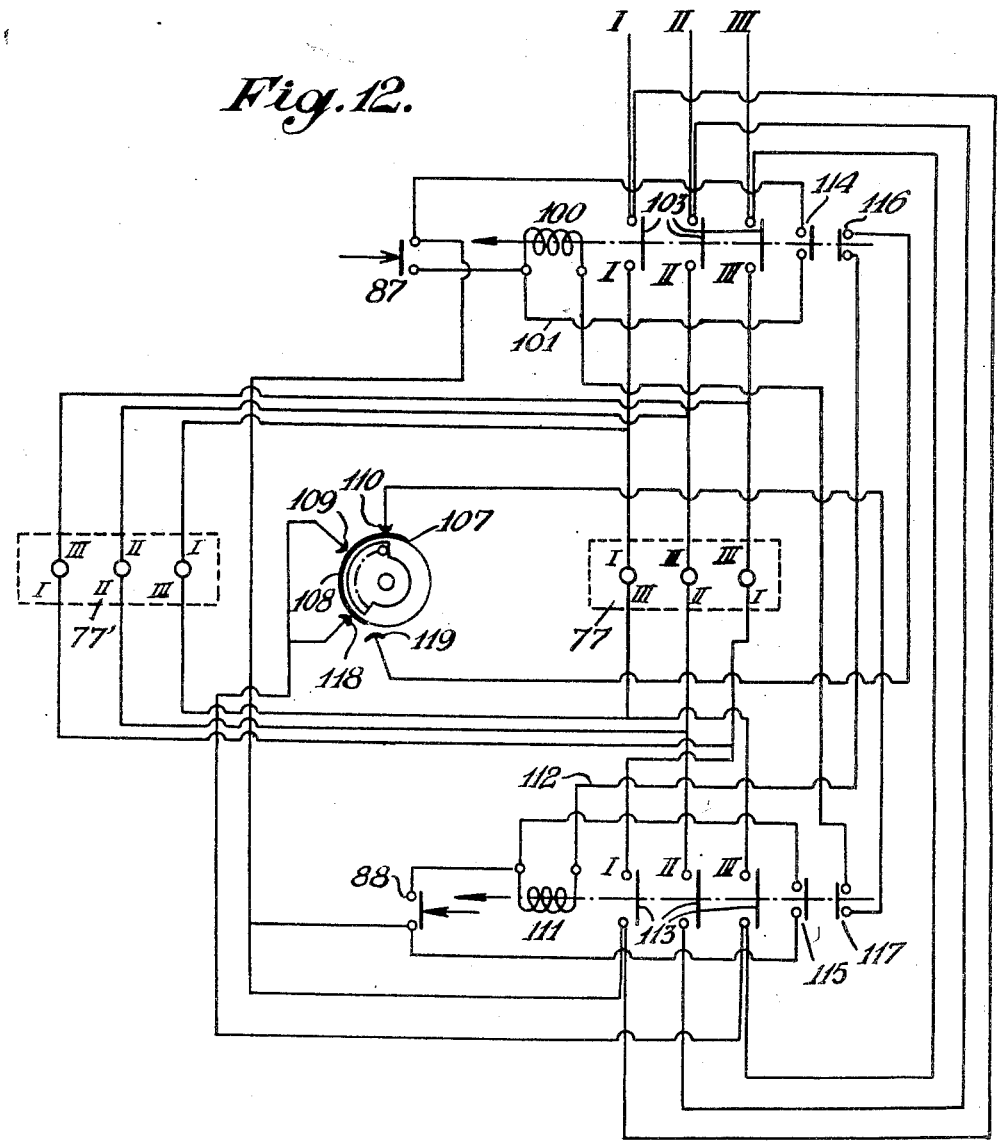

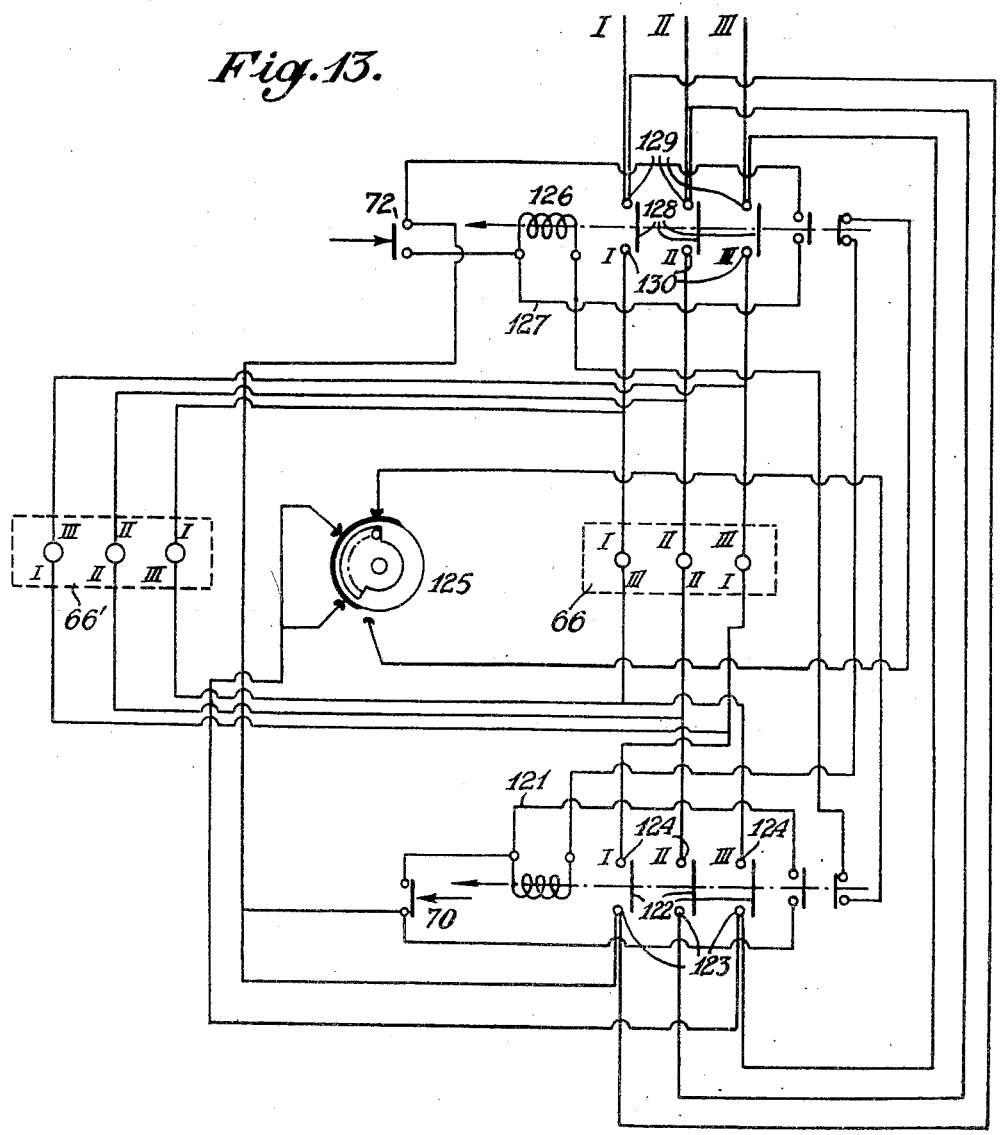

Patented Dec. 15, 1953

2,662,350

UNITED STATES PATENT OFFICE 2,662,350

PROCESS AND APPARATUS FOR POLISHING GLASS

Edmond Joseph Ghislain Laverdisse, Auvelais, Belgium, assignor to Les Glaceries de la Sambre Societe Anonyme, Auvelais, Belgium, a Belgian company Application March 23, 1949, Serial No. 83,014

Claims priority, application Belgium March 27, 1948

14 Claims. (Cl. 51—56)

The present invention relates to a process of polishing glass and a machine for carrying out this process.

It is known, for the production of polished glass, to lead an endless band or sheet of glass coming from the furnace through a lehr where it is subjected to slow and methodical cooling, whereupon it is subjected to grinding by discs of cast iron under which rough sand is fed in order to wear down asperities in the glass and to determine the planimetry and the parallelism of its faces, the glass then being subjected to polishing which confers thereto its transparence and shine.

The polishing operation is performed by means of felt discs called polishers, which are impregnated with a paste of iron oxide herein referred to as the polishing composition, and are rotated and pressed against the glass with increasing pressure. It is known to submit simultaneously both faces of the glass to grinding, then to polishing, and in either case, to select the direction of rotation of the tools so that their reactions on the glass are opposed, thereby reducing stresses in the glass. While this system has generally proved to be satisfactory for grinding, the frictional pressure of the tools on the glass being low, it has inconveniences in polishing, where the coefficient of friction increases materially as the surface of the glass becomes heated, whereby transverse stresses take place in the glass, its progression is impeded and breakage may occur. Moreover, it is necessary to leave, between successive polishers, relatively large spaces to allow cooling of the glass, but this prolongs the duration of the operation.

It is the object of the present invention to avoid these inconveniences and, in accordance therewith, there are imparted to the polishing tools rectilinear reciprocating movements transversely of the forward progression of the glass band. These reciprocating movements of the tools take place in opposite directions of the tools working opposite each other on both sides of the glass, and/or for the tools working in succession on the same side of the glass. Thus dangerous stresses in the glass are avoided.

Another advantage of this process consists in making it possible to locate closer to each other the tools working in succession on the glass and consequently to reduce the causes for cooling the glass. This advantage is particularly noticeable when, according to one embodiment of this invention, the polishers have a square or rectangular shape instead of the usual circular shape.

Whatever be the shape of the polishers, these may be rotated while they perform their reciprocating motion transversely of the direction of progress of the glass. Moreover, they may advantageously be moved in the direction of progression of the glass, in order to diminish their resistance to said progression, the movement of the polishers being either at the same speed as, at a lower speed or at a higher speed than the progression of the glass.

In order to carry out these various motions, the polishers are mounted on beams arranged in pairs, one below and the other above the glass, transversely thereof.

The lower beam is mounted on a frame which carries the mechanism for reciprocating same and the means for feeding same with polishing composition and with oil. The upper beam is also mounted on said frame, which may be stationary or movable. In the latter case, the frames move in the same direction as the glass and when the polishing operation is completed, the two beams of each pair are successively separated, brought back to their initial position and again set in action while they again start their movement on the glass.

An embodiment of the machine according to this invention is illustrated diagrammatically by way of example in the accompanying drawings.

Fig. 1 shows in longitudinal elevation and part section a general view of the machine.

Fig. 2 is on a larger scale a cross section on line II—II of Fig. 1.

Fig. 3 is a fragmentary plan view of the machine.

Fig. 4 is a fragmentary plan view showing a modification.

Fig. 5 is on a larger scale, a fragmentary section on line V—V of Fig. 2.

Fig. 6 is a cross section on line VI—VI of Fig. 2.

Fig. 7 is a plan view of the lower downward lift.

Fig. 8 is an elevation on a larger scale of the upper upward and downward lifts.

Figs. 12 and 13 are schematic wiring diagrams of the machine.

Figure 9:
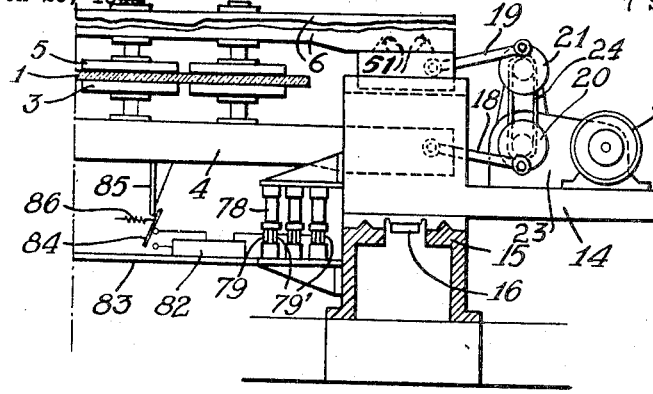
Fig. 9 is a fragmentary section on line IX—IX of Fig. 1.

The machine illustrated in Figs. 1 to 3 is adapted to receive a continuous glass band or sheet 1 which has already been subjected to grinding and may or may not have been subjected to preliminary polishing, said glass sheet being fed on rolls 2. The sheet 1 thus passes between the lower polishers 3 carried by beams 4 and the upper polishers 5 carried by beams 6 the polishers 3 and 5 are respectively rotated by means of worms 93, 95 actuated by motors 92, 94 carried by the beams 4, 6. The polishers 3 and 5 being brought into contact with both sides of the glass respectively, the beams 4 and 6 are reciprocated, preferably in opposite directions as will be described hereafter. While polishing thus takes place, the beams are carried in the same direction as the glass sheet so as to accompany same to the exit end of the machine. Before the end, the polishers are moved away from the glass and, in the example considered, their forward movement is accelerated so that, without the work being interrupted, each lower beam 4 is brought down by a downward lift 7 on a lower set of rolls 8, while the corresponding upper beam 6 is lifted by an upward lift 9 and deposited onto an upper set of rolls 10. The beams 4 and 6 are then brought back to the entrance end of the machine, where an upward lift 11 and a downward lift 12 respectively bring them back into their initial positions in order to start again the polishing operation.

Fig. 2 illustrates a pair of beams in operative position. The beams 4 and 6 are mounted for reciprocating movement across the glass in a frame made of two parts 13, 14, which frame is slidably mounted on a base comprising a pair of rails 15 parallel to the glass sheet 1. To this end each part 13, 14 is provided with a rack section 16 adapted to be engaged in turn by a driving wheel 17.

The transverse movements of the beams are imparted thereto by connecting rods 18, 19 driven by crank discs 20, 21 rotated by a motor 22 through a speed reducing gear 23, all these parts being carried by the frame 14. The movements of the two beams are synchronised by a chain 24, the crank pins 25, 26 being preferably at 180° from each other so that the beams always move in opposite directions, one being at the end of its leftward stroke when the other is at the end of its rightward stroke. Thus transverse stresses in the glass sheet are reduced to a minimum.

The polishers 3 and 5 are advantageously of rectangular shape as shown in Fig. 3, this shape insuring a great working efficiency when the polishers are mounted against rotation in their carrying beams. They may however have another shape, such as a circular shape, and be mounted for rotation as shown in Fig. 4. In order still further to reduce the stresses in the glass, it is advantageous to alternate the movement of adjacent beams, one beam moving from right to left, while the preceding one and the following one move from left to right.

In the example illustrated in Fig. 2, the part 13 of the frame carries a receptacle 27 for the polishing composition which, by means of the pump 28 supplies the polishers 3 and 5 through pipes 29, 30. When, as shown in Fig. 3, the polishers do not rotate, the composition may be poured near their edges (as shown at 31, in Fig. 5), whereby a better distribution of the composition over the whole surface of the polishers is obtained.

In proximity to the receptacle 27 is an oil receptacle 32 which, by means of pump 33 and pipes 34, 35, feeds the cylinders 36 (Fig. 5) with oil adapted to press the polishers against the glass, under the action of pistons 37 and against the pressure of return springs 38. Instead of hydraulic pistons, other means such as adjustable springs may be used for controlling the pressure of the polishers.

The frames 13, 14 also carry brackets 39 (Fig. 6) with freely rotating rolls 40 adapted to support the glass between the successive rolls of polishers 3.

As shown in Fig. 1, the successive beam-carrying frames are in contact with each other, each frame pushing the preceding frame along the rails 15, under the action of the gears 17 driven from motors not shown. Thus the beams travel in the same direction as the glass while polishing same. The speed of travel of the beams need not be equal to that of the glass sheet, but it may be greater or smaller than the speed of the glass.

It is also seen that this arrangement reduces to a minimum the portion of the glass sheet or band which, at a given moment, is located between two sets of polishers and is exposed to cooling. Thus the high temperature of the glass surface, which is favorable to polishing, is better preserved than with the known devices.

The frames 13, 14 are provided with contact pieces 78 (Fig. 2) which engage bus-bars 79 extending from the entrance to nearly the exit end of the machine in order to supply current to the motors controlling the reciprocating movements of the beams, the supply of composition, oil, etc.

Figure 10:
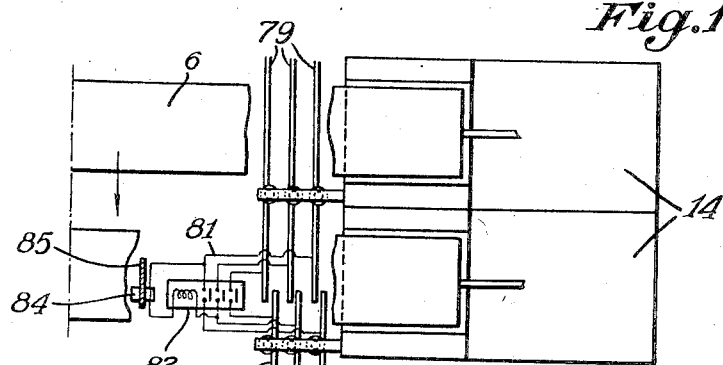
Fig. 10 is a corresponding plan view.

When polishing is finished, the beams are near the exit end of the machine. At this point the bars 79 are interrupted and they are extended by short bar sections 79' to which they are connected by connections 81 under the control of a contactor 82 mounted on a stationary support 83 (Figs. 9 and 10).

In order that, on leaving the machine, the upper beams 6 will occupy the required position to be caught by the upward lift 9, the contactor 82 is controlled by a switch 84 situated in the path of an abutment 85 secured to the beam 4. During the reciprocating movement of the beam under the action of motor 22, the abutment 85 opens the switch 84, thus interrupting the supply of current to the bars 79' and causing the motor 22 to stop, whereby the beams are stopped in a central position. The motors actuating pumps 28 and 33 are stopped at the same time and the polishers are returned back to their inoperative positions under the action of the springs 38. The abutment 85 is so proportioned as to break the supply of current to the bars 79' until the corresponding beam is disengaged therefrom, whereupon the switch 84 is returned back to its closed position by a spring 86.

The frame 13, 14 is then engaged by a dog 41 (Fig. 1) on a fast moving chain 42 which carries the frame towards and onto the downward lift 7 which is provided with a rack driven by gears 76 from the motor 77 (Fig. 7). At the same time hooks 43 on the upward lift 9 engage, as hereinafter described, a suspension bar 44 on the beam 6 and lift the same from the frame 13, 14. Meanwhile an operator has disconnected couplings 45, 46 inserted in the composition pipe 30 and oil pipe 35 which are also provided with non return valves 47, 48.

When the frame 13, 14 carrying the beam 4 is in position on the downward lift 7, it has engaged the contact 87 and caused same to energize motor 77. The lift 7 lowers the frame 13, 14 down to the level of the lower set of rolls 8 on which it is pushed by a dog 49 on a chain 50, at the same time actuating the switch 88 which reverses the rotation of motor 77 and causes the lift 7 to move upwards in order to fetch the next frame 13, 14. As it reaches the entrance of the machine, the frame 13, 14 moves the switch 89 controlling the upward lift 11 and is carried up by the latter until it is again under the level of the glass sheet. At this moment the upper beam 6 coming from the upper set of rolls 10 is brought by the downward lift 12 onto the frame 13, 14, where it is centered by the conical points 51 which fit exactly into corresponding recesses provided on the beam 6.

The frame 13, 14 is then pushed by a dog 52 on a chain 53, operating on its way the switch 90, causing the lift 11 to move downward. When released by the dog 52, the frame 13, 14 just raised by the lift 11 is pushed against the preceding frames 13, 14 on the rails 15 by the arm 54, pressed by spring 55. A cam 56 is provided for periodically pushing said arm back. From that moment the rack 16 of the frame in question is again engaged by the gear 17, the contact pieces 78 again engage the bars 79, the polishers are again brought into contact with the glass and start their operation.

Figure 11:
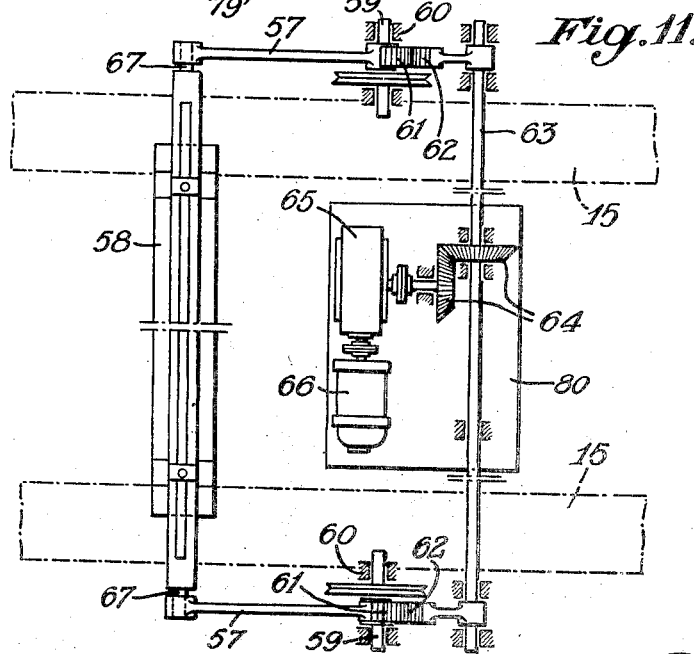
Fig. 11 is a plan view of the actuating mechanism for the upper downward lift.

The construction of the upper lifts, i. e. the upward lift 9 and the downward lift 12 is shown in detail on Figs. 8 and 11. These apparatus are arranged symmetrically at both ends of the machine and they comprise rocker arms 57 carrying a cross bar 58 on which are suspended the hooks 43 for successively engaging and releasing the suspension bars 44 of the beams 6.

The arms 57 which are mounted on each side of the machine, are pivoted on trunnions 59 in stationary bearings 60 (Fig. 11). Rigidly connected with said arms are toothed sectors 61 meshing with sectors 62 which through shaft 63, gears 64 and a speed reducer 65, are driven from a reversible motor 66 mounted on a platform 80.

In Fig. 8, the arms 57 of lift 9 as illustrated in full line, are in waiting position, i. e. in readiness for engaging an incoming beam. In the ends of the arms 57 is pivoted at 67 the cross bar 58 which normally is urged by the weight 68 to take up a position in which the hooks 43 are ready to engage the suspension bar 44 of the first incoming beam.

The beam 6 whose bar 44 is engaged by the hooks 43 carries a finger 69 which closes a switch 70 for starting the motor 66. The arms 57 then are lifted with the beam 6, the cross bar 58 pivoting on the axis 67 during this movement, until the beam 6 rests on the set of rolls 10. At that moment, the finger 71 on the cross bar has closed the reversing switch 72 for the motor 66 and the cross bar 58 has compressed a spring 73 which, as soon as the arms 57 start on their return stroke, quickly tips the cross bar 58 so that the bar 44 of the beam 6 is freed by the hooks 43.

While the beam 6 is carried by dogs 74 on the rolls 10 towards the entrance end of the machine, the arms 57 of the lift 9 are moved downwards and the beam 58 again takes up its waiting position, as it pushes the switch 75 which causes the stoppage and reversal of the motor 66'.

The same movements take place in the downward lift 12 which takes the beam 6 from the rolls 10 and lowers it until it is at the level of the glass and comes to rest on the frame 13, 14 brought up by the lower lift 11.

It will be understood that the frame 13, 14 carrying the lower beam 4, closes the switch 87 when it is positioned on lift 7. Electric current then energizes coil 100 (see Fig. 12), closes contactor 101, the contacts 103 of which connect the current supply terminals with the leads to motor 77. This motor is set into motion and lowers the lift 7 with the beam 4 until the carrying frame 13, 14 has reached the level of the lower rolls 8. At the same time, through pinions 105, 106, said motor rotates the disc 104 which, at the lower end of the travel of the lift 7 brings the end 107 of the contacting strip 108 between two adjustable points 109, 110. The circuit thus is closed, coil 100 being de-energized, disconnects the supply at 103, stopping the motor 77.

The frame 13, 14 is then, as explained before, pushed on the rollers 8 by a finger 49 (Fig. 1) carried by chain 50. On its way, the frame actuates the switch 88, which starts the motor 77 in reverse direction to move the lift 7 upwards. It will be understood that the switch 88 being closed, coil 111 of contactor 112 will be energized and close the contact 113, thereby causing current to be supplied to terminals 113 and rotate the motor 77 in the reverse direction.

The switches 87, 88 are closed only for a very short time. Contactors 101 and 112 are caused to remain in the energized position by the moving contacts 114 and 115 of the respective locking devices 116, 117, as long as the points 109, 110 on the one hand, the points 118, 119 on the other hand are interconnected.

At the inlet end of the machine, a motor 77' for the lower lift operates in the same manner, so that when the frame 13, 14 carrying the beam 4 closes the switch 89, the lift 11 is raised and stopped when the lower tools 3 have reached the level of the under surface of the glass. The operation is just the same as has been described with respect to lift 7.

As the lower beam is again in working position, its points 51 engage in the corresponding recesses of the upper beam 6 which meanwhile, has been lowered by the upper lift 12.

The frame 13—14, is then engaged as described in Fig. 1 by a finger 52 carried by the chain 53, and it actuates on its way the switch 90 in order to cause the lift 11 to move downwards. The frame 13, 14 is pushed against the preceding frame by the arms 54 as previously described. From that moment, the rack 16 is engaged by the gear 17, the contact pieces 78 engage the feed bars 79 and the polishing tools start again to work.

Referring to Fig. 8, the arms 57 of the lifts 9 are illustrated in full lines, in the waiting position. The cross bar 58 pivotally mounted at 67 on the ends of the arms 57, is held by a weight 68 in a position adapted to allow the suspension bar 44 of the first oncoming beam 6 to be engaged by the hooks 43.

When the said beam 6 is seized by the hooks 43, it closes by means of finger 69, the switch 70 which starts the operation of motor 66 as will be explained with reference to Fig. 13. From switch 70 current passes through and energizes coil 120 of contactor 121, the movable contacts 122 of which connect the current supply terminals 123 with the terminals 124 of motor 66. Motor 66 is set in operation, and rocks upwardly the arms 57 which lift the beam 6; meanwhile the weight of the beam 6 causes the cross bar to pivot on the axis 67 so that the beam 6 remains in the vertical position until it is deposited by the arms 57 on the upper rollers 10.

During this time, motor 66 has rotated disc 125 which is fitted with a contact strip similar to strip 108 described in connection with motor 77, moment the spring 73 compressed by the cross bar 56, causes the latter to tilt backwards and the hooks 43 to free the suspension bar 44. This tilting movement causes finger 71 (Fig. 8) to close contact 72, which, as shown in Fig. 13 reverses the rotation of motor 66, thereby causing the arms 57 to move back to the position illustrated in full lines in Fig. 8. The downward movement of said arms is stopped by the breaking of the contact between the strip on disc 125 and the contact points, in the same manner as has been explained with respect to strip 108 and contact points 109, 110, and 116, 119.

It will be understood that the reverse rotation of motor 66 has been obtained by the energization of coil 126 closing the contacts 128 which connect the supply of current with the terminals 130 of motor 66.

The operation of lift 12 is controlled by a motor 66' in exactly the same manner as has been described for lift 9, controlled by motor 66.

In a like manner to that described in connection with the operation of motor 77, the switches 70 and 72, are closed only for a very short time, and the contacts 122 and 128 are controlled by suitable locking devices, as explained in connection with reference to Fig. 12.

It is obvious that constructional modifications may be effected in the machine as described and illustrated, without departing from the scope of the appended claims. When the beams are mounted on stationary frames, the mechanisms for moving the beams along with the glass band, for moving them away from the band and then back to their positions are of course omitted, and the glass may be stationary or kept in motion during the polishing operation.

It will further be understood that instead of a rectilinear reciprocating movement, the beams may have imparted thereto a curvilinear motion or they may be moved in a closed path across the glass band. In each of these cases, care will be taken to move the upper and lower beams, and/or adjacent beams in opposite directions in order to reduce transverse stresses in the glass.

I claim:

1. A process of simultaneously polishing both sides of a sheet of glass, comprising feeding a glass sheet between sets of upper polishing tools and sets of lower polishing tools supported to rotate on vertical axes, applying adjustable pressure to said tools towards said glass sheet rotating said sets of tools on their vertical axes, imparting to said sets of tools rectilinear reciprocating movements transversely of said sheet; the polishing tools operating on one side of the glass being moved in opposite direction to the polishing tools operating on the other side of the glass.

2. A process of simultaneously polishing both sides of a sheet of glass, comprising continuously feeding a glass sheet between two sets of polishing tools supported to rotate on vertical axes, adjustably pressing the tools of one set against one side of said sheet and the tools of the other set against the other side of said sheet, and simultaneously imparting to both sets of tools rectilinear reciprocating movements transversely of said sheet, adjacent tools of each set being rotated in opposite directions relatively to each other, the polishing tools on one side of the glass being moved in opposite direction to the polishing tools of the other side of the glass.

3. A process of simultaneously polishing both sides of a sheet of glass comprising feeding a glass sheet in a substantially horizontal direction between two sets of polishing tools, adjustably pressing the tools of one set against one side of said sheet and the tools of the other set on the other side of said sheet, imparting to both sets of tools rectilinear reciprocating movements transversely of said sheet in mutually opposite directions, and imparting to each tool a rotation about an axis at right angles to the glass sheet.

4. A process of simultaneously polishing both sides of a sheet of glass, comprising feeding a glass sheet in a substantially horizontal direction between two sets of polishing tools, adjustably pressing the tools of one set against one side of said sheet and the tools of the other set on the other side of said sheet, imparting to both sets of tools rectilinear reciprocating movements transversely of said sheet in mutually opposite directions, imparting to each tool a rotation about an axis at right angles to the glass sheet, and imparting to both sets of tools a movement in a direction parallel to the direction of feed of the glass sheet, but at a speed different from the speed of said sheet.

5. A machine for simultaneously polishing both sides of a sheet of glass, comprising a base, frames on said base, means on said frames for supporting a glass sheet in substantially horizontal position, pairs of beams on said frames comprising each an upper beam and a lower beam, said beams being supported on said frames for facing opposite sides of the glass sheet, polishing tools on each of said beams, supported to rotate on axes extended at right angles to said beams the tools on said upper and lower beams having flat surfaces adapted respectively to polish the lower side and the upper side of said glass sheet, means connected to said tools for rotating said tools on their rotation axes, means on said frames for imparting to said beams rectilinear reciprocating movements across the glass sheet in opposite directions to each other.

6. A machine for simultaneously polishing both sides of a sheet of glass, comprising a base, frames on said base, means on said frames for supporting a glass sheet in substantially horizontal position, pairs of beams on said frames each comprising an upper beam and a lower beam, polishing plates mounted on vertical axes in each of said beams, the plates on said upper and lower beams being adapted respectively to polish the lower side and the upper side of said glass sheet, means on each frame for rotating said plates about their respective vertical axes, means on said beams for applying pressure to said plates, means on said frames for feeding polishing composition to the polishing plates on the pair of beams carried by said frame, means on said frames for imparting to said beams rectilinear reciprocating movements across the glass sheet and means on one of said frames interconnecting the beams of each pair to cause the beams of each pair to move in opposite directions to each other.

7. A machine for simultaneously polishing both sides of a sheet of glass, comprising a base, frames movably positioned on said base, movement toward one end thereof, means on said frames for supporting a glass sheet in substantially horizontal position, a lower beam movably supported on said frames for facing the lower side of the sheet of glass, an upper beam movably supported on said frames above said lower beam for facing the upper side of the sheet of glass, sets of rotary polishing plates supported on each of said beams to rotate on axes extended at right angles to said beams, the plates on the upper beam and on the lower beam being adapted to polish the upper and the under side of said glass sheet respectively, means on one of said frames for reciprocating said beams in opposite directions across said glass sheet, a receiving structure extending above said frames, and means on said structure adjacent the said one end of said frame for lifting said upper beam from said frame onto said structure.

8. A machine for simultaneously polishing both sides of a sheet of glass comprising a pair of elongated parallelly spaced rails frames rested on said rails to be movable parallel to the length of said rails, means on said frames for supporting a glass sheet along a substantially horizontal plane; pairs of beams on said frames comprising each a beam above and a beam below said plane, sets of polishing tools on each of said beams supported to rotate on axes extended at right angles to said plane, means connected to said sets of tools for rotating said sets of tools, the upper beams of each pair being removably supported on its carrying frame, means on said frames for imparting to said beams reciprocating movement transversely of the glass sheet, and means for moving said frames on said rails.

9. In a machine according to claim 8, a structure extending above said rails, said moving means moving said frames toward one end of said rails; means on said structure adjacent the said one end for successively lifting each upper beam from its carrying frame at the said one end of the machine and placing it on said structure, and means on said structure for separately returning the successive upper beams to the other end of the machine.

10. In a machine according to claim 8, wherein the moving means moves the frames toward one end of the rails, means at the said one end of the machine for successively lifting each upper beam from its carrying frame, means at the said one end of the machine for successively lowering each carrying frame with its lower beam structures above and below the rails to receive and move the raised upper beams and the lowered frames to the other end of the rails, means at the said other end of the rails for separately returning the successive upper beams and the successive carrying frames with their lower beams to the rails at the other end thereof, and means at the other end of the machine for bringing each successive upper beam together with its carrying frame.

11. In a machine according to claim 10, means on said rails for accelerating the movement of said frames before they reach the said one end of the machine, means at the said one end of the rails for separating each upper beam from its carrying frame and means at the said other end of the machine for separately returning the upper beams and their carrying frames to their operative positions.

12. In a machine according to claim 8, an upward lift and a downward lift for the successive upper beams at the exit end and at the entrance end of the machine respectively, means operated by said upper beams for controlling the movements of both said lifts, a downward lift and an upward lift for the successive carrying frames at the exit end and at the entrance end of the machine respectively, and means operated by said frames for controlling the movement of both last mentioned lifts.

13. In a machine according to claim 8, a structure extending above said frames, an upward lift and a downward lift for the successive upper beams at the exit end of the machine and at the entrance end of the machine respectively, each said lift comprising a pair of rocker arms pivotally mounted on said structure, a tiltable cross bar journalled in said arms, hooks on said cross bar for engaging each successive upper beams and means operated by said upper beams for controlling the movements of said lifts.

14. In a machine according to claim 8, a structure extending above said frames, an upward lift on said structure for successively lifting each upper beam from its carrying frame at the exit end of the machine, and stop means positioned on said machine adjacent the exit end of the machine to be engaged by said upper beams as they approach the exit end for stopping each upper beam in a predetermined position before it reaches the exit end of the machine.

EDMOND JOSEPH GHISLAIN LAVERDISSE.

References Cited in the file of this patent

UNITED STATES PATENTS

| Number | Name | Date |
| --- | --- | --- |
| 792,854 | Schulte | June 20, 1905 |
| 1,006,881 | Russell | Oct. 24, 1911 |
| 1,474,672 | Heuze | Nov. 20, 1923 |
| 1,716,819 | Heuze | June 11, 1929 |
| 1,724,703 | Fox | Aug. 13, 1929 |
| 1,803,752 | Ford | May 5, 1931 |
| 1,833,359 | Fox et al. | Nov. 24, 1931 |
| 1,833,360 | Fox et al. | Nov. 24, 1931 |
| 1,836,364 | Drake et al. | Dec. 15, 1931 |
| 1,962,767 | Crowley et al. | June 12, 1934 |
| 1,989,408 | Goodwillie | Jan. 29, 1935 |
| 2,105,637 | Davis | Jan. 18, 1938 |
| 2,176,481 | Waldron et al. | Oct. 17, 1939 |
| 2,269,197 | Hamilton | Jan. 6, 1942 |
| 2,285,318 | Waldron | June 2, 1942 |
| 2,304,974 | Waldron et al. | Dec. 15, 1942 |
| 2,348,581 | Waldron | May 9, 1944 |

FOREIGN PATENTS

| Number | Country | Date |
| --- | --- | --- |
| 543,040 | France | Sept. 10, 1927 |